United States Patent [19]

Sugiyama

[11] Patent Number: 5,642,958
[45] Date of Patent: Jul. 1, 1997

[54] ENGAGEMENT STRUCTURE OF CONNECTING SHELL

[75] Inventor: Shinichi Sugiyama, Fuji, Japan

[73] Assignee: Jatco Corporation, Japan

[21] Appl. No.: 529,974

[22] Filed: Sep. 19, 1995

[30] Foreign Application Priority Data

Sep. 29, 1994 [JP] Japan .................... 6-259515

[51] Int. Cl.⁶ .................... F16H 3/44; F16H 1/28
[52] U.S. Cl. .................... 403/359; 192/70.2
[58] Field of Search .................... 192/70.2, 70.19; 403/359, 358, 364

[56] References Cited

U.S. PATENT DOCUMENTS

| 3,760,921 | 9/1973 | Gillespie | 192/70.2 X |
| 4,082,171 | 4/1978 | Lalin et al. | 192/70.2 |

FOREIGN PATENT DOCUMENTS

| 63-246542 | 10/1988 | Japan . | |
| 4-272516 | 9/1992 | Japan | 192/70.19 |
| 1442254 | 7/1976 | United Kingdom | 192/70.2 |
| 2123905 | 2/1984 | United Kingdom | 192/70.2 |

*Primary Examiner*—Anthony Knight
*Attorney, Agent, or Firm*—Rossi & Associates

[57] ABSTRACT

An engagement structure for coupling a connecting shell to a clutch drum of an automatic transmission includes protrusions on the connecting shell that engage with grooves of the clutch drum. Edges of the grooves and edges of the protrusions are rendered by plastic deformation upon press-stamping to be formed thicker than other portions of the connecting shell and clutch drum. The resulting increased area of abutment between the connecting shell and the clutch drum transmits the same torque with less surface pressure, such that reduction in weight and size of the overall transmission components can be realized.

6 Claims, 5 Drawing Sheets

ENGAGEMENT STRUCTURE OF CONNECTING SHELL

BACKGROUND OF THE INVENTION

1. Field of the Invention

The present invention relates to an engagement structure of a connecting shell wherein the connecting shell is coupled with a clutch drum for united rotation thereof in an automatic transmission.

2. Description of the Prior Art

An automatic transmission has been put into practice which is constructed by adapting a torque converter to a gear change mechanism including a planetary gear device. Such an automatic transmission is mounted on an automobile for example to release a driver from a complicated clutch operation.

A gear change mechanism in the example of the automatic transmission of an automobile comprises rotary members such as planetary gears, a clutch, a brake, and a main shaft, and coupling members such as a connecting shell for connecting these rotary devices mutually.

The connecting shell is to couple two or more of rotary members for united rotation thereof around a main shaft. Although there is known a case where the two rotary members are united integrally with facing ends of one connecting shell, in view of convenience of designing or assembling a mechanism, there is another case where the rotary device and the connecting shell are engaged with the aid of an engagement structure. In the latter, torque is transmitted through the engagement therebetween in the direction of rotation thereof, and in contrast they can be driven to slide axially for separation thereof.

Although the engagement structure is, as disclosed in Japanese Laid-Open Patent Publication No. 63-246542, applicable to a coupling portion between a clutch drum and the connecting shell, it may be applied to coupling devices and rotary members other than the foregoing members or to coupling portions between rotary members.

The engagement structure of the conecting shell at the coupling portion with the clutch drum includes many grooves which are forced by cutting out the end of the cylindrical external periphery of the clutch drum axially at an equal interval, and many protrusions which are formed by cutting out the circumferential part of the connecting shell radially at an equal interval. The conecting shell and the clutch drum are intersecting each other, having the protrusions of the connecting shell be engaged with the grooves of the clutch drum.

In the following, the engagement structure of the connecting shell disclosed in the aforementioned Japanese Laid-Open Patent Publication No. 63-246542 will be described with reference to FIGS. 4 and 5.

Referring to FIGS. 4 and 5 there are illustrated a partial sectional view of an automatic transmission, and an axial view illustrating the engagement structure when viewed from the left side of FIG. 4.

Herein, a reverse clutch drum 31 and a connecting shell 32 are coupled with each other through an engagement structure 30 for transmittal of torque.

As illustrated in FIG. 4, the automatic transmission is constructed by combining a torque converter 36 contained in a converter housing 39A with a gear change mechanism 38 contained in a transmission casing 39B. The transmission casing 39B and the converter housing 39A are securely fixed to each other with the aid of a plurality of bolts not illustrated. The torque converter 36 serves to transmit driving force inputted from an engine located at the right but not illustrated into an input shaft 35 to a main shaft 33 of the gear change mechanism 38. An oil pump 37 supported by the converter housing 39A at the center of the same serves to circulate oil to a torque converter 36 as well as to produce high pressure oil required for the control of the gear change mechanism 38.

A main part, not illustrated, of the gear change mechanism is disposed further at the left side of the connecting shell 32 disposed at the left end of FIG. 4. The main part comprises a plurality of stages of planetary gears, clutches other than those illustrated in the figure, a brake, a hydraulic control mechanism, a mechanism for transmitting a gear rotation output to the output shaft of the gear change mechanism 38, and a bearing mechanism for the main shaft 33, etc.

A reverse clutch drum 31 of the gear change mechanism 38 is a united inner-outer press drum, which is constructed by drawing a steel plate into a doughnut shape and forming an external periphery thereof into a cylindrical shape and which includes an inner drum 31H fixed to the inside thereof. There are formed a spline for holding a clutch plate on the side of an entrance of the inner drum 31H and formed a hydraulic cylinder disposed on a bottom side. In an annular space inside the reverse clutch drum 31 there are stored a member constituting the reverse clutch and a clutch (high clutch) of another set. Between the inner drum 31H and the high clutch 34 there are closely assembled inner and outer clutch plates, a retaining plate, a piston, and a spring, etc., these members constituting the reverse clutch drum. A cylinder end of the reverse clutch drum 31 is connected with an outer edge of the connecting shell 32 through the engagement structure 30.

The connecting shell 32, that is a disk-shaped member formed by drawing a steel sheet, is disposed so as to intersect a cylindrical outer periphery of the reverse clutch drum 31. The connecting shell 32 connects the reverse clutch drum 31 and the planetary gear disposed at the left side but not illustrated and rotates them integrally. In the engagement structure 30, the protrusions 32A formed on the outer periphery of the connecting shell 32 are engaged with many grooves formed radially in the reverse clutch drum 31 at the end of the same. Between the reverse clutch drum 31 and the connecting shell 32 torque, i.e., rotary force around the main shaft 33 is transmitted through the engagement. In contrast, upon disassembly/assembly only left sliding of the connecting shell 32 along the main shaft 33 ensures rapid removal/ achievement of the engagement between the reverse clutch drum 31 and the connecting shell 32.

In the engagement structure 30 surrounded by a broken line in FIG. 5, the reverse clutch drum 31 includes a groove 31B formed by cutting out the cylinder end of the cylindrical outer periphery perpendicularly to the paper surface at an equal interval. An edge of the protrusion 31A left behind after the groove 31B is formed abuts an edge of the protrusion 32A and transmits torque. Upon disassemby/ assembly, the engagement state is rapidly released/ completed by forcing the connecting shell 32 to slide in the direction of the upper portion/back surface of the paper. It is noted here that in FIG. 5 a gap between the protrusion 32A and the protrusion 31A is exaggerated for convenience of the illustration. Actually, for avoiding shocking abutment the protrusions 31A is loosely held over the full width of the grooves 32A.

However, the conventional engagement structure of the connecting shell has the following difficulties.

In the conventional engagement structure 30 illustrated in FIGS. 4 and 5, transmittal of torque between the connecting shell 32 and the reverse clutch drum 31 is achieved only at the abutment part between the protrusion 32A and the protrusion 31A illustrated in FIG. 5. More specifically, there is transmitted torque which is obtained multiplying a total area (a)×(n), (a) an area of the abutment part (force reception area) in one engagement structure 30 and (n) the number of the protrusions 32A, by pressure (p) applied to the abutment part and by (r) a radius of the abutment part. There is accordingly increased the pressure (p) onto the abutment part when the transmitting torque through the connecting shell 32 is increased as an output of the automatic transmission is increased or when miniaturization of the gear change mechanism 38 is attempted by way of reducing the diameter of the reverse clutch drum 31.

Particularly, the reverse clutch has a greater speed reduction ratio to hereby operate at a reverse range where large torque is outputted so that the pressure (p) applied to the abutment part between the connecting shell 32 and the reverse clutch drum 31 is originally considerably larger even though the engagement structure 30 is located outward.

The increase of the pressure (p) increases a wear rate of the abutment part in the engagement structure 30 to shorten the lives of the connecting shell 32 and the reverse clutch drum 31. The further increase of the pressure (p) causes compression breaking of the abutment part in the engagement strucutre 30 and buckling deformations of the protrusions 32A and the protrusions 31A. It is therefore necessary to increase the total area (a)×(n) of the abutment part for preventing the pressure (p) from being increased when it is intended to increase the foregoing transmitting torque or to miniaturize the gear change mechanism 38.

Since the area (a) of the abutment part in one engagement structure 30 is a product of the thickness of the connecting shell 32 and the thickness of the reverse clutch drum 31, an increase of one or both of the connecting shell 32 and the reverse clutch drum 31 ensures an increase of the total force reception area.

However, the increased thickness of the connecting shell 32 requires displacement of the locations of rotary components and coupling components of the gear change mechanism 32 stacked axially along the main shaft 33, needing great alteration of the conventional design.

The increased thickness further makes difficult pressing of the connecting shell 32 and hence increases the cost of the pressing. And it is necessary to extend the reverse clutch drum axially, which is disadvantageous for shortening the entire length of the automatic transmission.

Increasing of the thickness of the reverse clutch drum 31 causes the weight of the reverse clutch drum 31 to be increased and opposes the intent of making the automatic transmission light weight. Also, it has the severe demerits in view of the material cost and the processing cost.

SUMMARY OF THE INVENTION

To solve the difficulties with the prior art, it is an object of the present invention to provide an engagement structure of a connecting shell wherein a force reception area in an engagement structure is increased to increase torque to be transmitted and miniaturize an automatic transmission without increasing the entire thicknesses of the connecting shell and the reverse clutch drum.

To achieve the above object, an engagement structure of a connecting shell of the present invention comprises in one aspect a clutch drum where many grooves are formed by cutting out axially the end of a cylindrical outer periphery at an equal interval and a connecting shell which is disposed intersecting the clutch drum, and includes many protrusions formed by cutting out radially a circumferential part at an equal interval, said protrusions being engaged with said grooves, the improvement being such that at least one edge of the groove and the protrusion along which the groove and the protrusion abut each other circumferentially for transmittal of torque is formed to be thicker than the other parts of the same member.

The edge of the protrusions of the clutch drum and the edge of the grooves of the connecting shell facing the foregoing edge circumferentially of the same collide and abut for transmittal of torque. An area of the abutment part is greater than a simple product of the thickness of the clutch drum and the connecting shell, owing to an increase of the partial thickness of at least one thereof. Accordingly, compared with the case without the partial increase of the thickness, identical or more transmittal of torque is achieved with less pressure. Namely, it is unnecessary to increase the thickness of the entire member in response to the pressure, and it is therefore possible to enjoy usual or even less thickness of the member excepting the locally increased part of the thickness. The increase of the local thicknesses of the members at the abutment thereof may be executed by rendering the edges of the abutment part to plastic deformation simultaneously with the blanking and pressing of the grooves and the protrusions or thereafter. Although it is necessary to leave behind a blank for the plastic deformation upon the blanking and pressing, it is easier than a processing of superimposing another member on the edges or a processing of doubly folding the edge and an increase of the strength of the edge is also anticipated owing to hardening by the processing.

When the thicknesses of the clutch drum and the connecting shell are both increased at the abutment part thereof, the increase of the thickness of 10% causes the increase of the force reception surface area of 20%, and the former of 20% causes the increase of the latter of 40%. Accordingly, only the slight amount of the increase of the thickness is required as far as an increase of transmittal of torque in an ordinary range and miniaturization of the automatic transmission are intended, and there is no possibility of the texture of the edge part being destroyed owing to excess plastic deformation provided the amount of the plastic deformation is slight.

Further, the abutment part comparatively thick compared with other parts may be obtained by first forming the entire to be thick and shaving the other parts leaving the abutment part behind.

As an another aspect of the present invention, thickness of three successive edges surrounding the groove of said clutch drum can be continuously formed to be thicker than the cylindrical outer periphery thereof.

In this engagement structure of the connecting shell, the thicknesses of not only the part where the clutch drum abuts the protrusion of the connecting shell upon torque transmitting but also the entire continuing edges surrounding the groove of the clutch drum are locally increased. Protuberance due to the increase of the thickness formed continuously from the abutment part on the edge of the bottom of the groove serves as a rib structure, resists buckling of the groove, moderates stress concentration at corners of the groove, and improves the strength of the whole clutch drum.

As still another aspect of the present invention, thickness of three successive edges surrounding the protrusion of said connecting shell can be continuously formed to be thicker than the radial part located thereinside.

In this engagement structure of the connecting shell, the local increase of the thickness of the connecting shell is applied not only to the abutment part but also to the entire of the edge. The protuberance due to the increase of the thickness formed continuously from the abutment part forms edging of the connecting shell to resist the buckling of the protrusion and hence improve the strength of the whole connecting shell.

In an engagement structure of a connecting shell in still further another aspect of the present invention, each of the grooves of the clutch drum is aligned with a valley expanding to the outside of a spline formed on the inner surface of said clutch drum, and there is an axially extending interstice between the outer periphery of a snap ring fitted over the spline and a bottom of said valley.

The "interstice extending axially between the valley of the spline of the clutch drum and the outer periphery of the snap ring" is used as a space for discharging oil. Lubricating oil supplied from the main shaft side and driven by centrifugal force for lubrication along an interstice between friction plates (drive plates and driven plates) flows axially along the valley of the spline of the clutch drum and flows out to the outside of the clutch drum even through the interstice (oil discharge space).

BRIEF DESCRIPTION OF THE DRAWINGS

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

In what follows, a first embodiment of an engagement structure according to the present invention will be described with reference to FIGS. 1A and 1B.

Figure 1A:
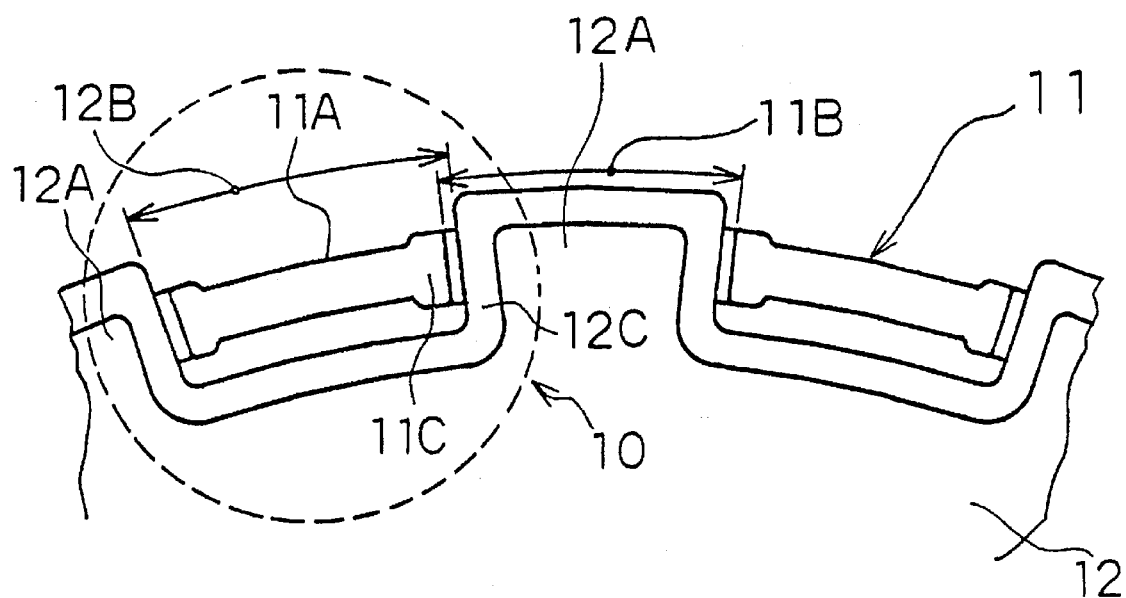
FIG. 1A is a partial enlarged view of a first embodiment of an engagement structure of the present invention.
Figure 4:
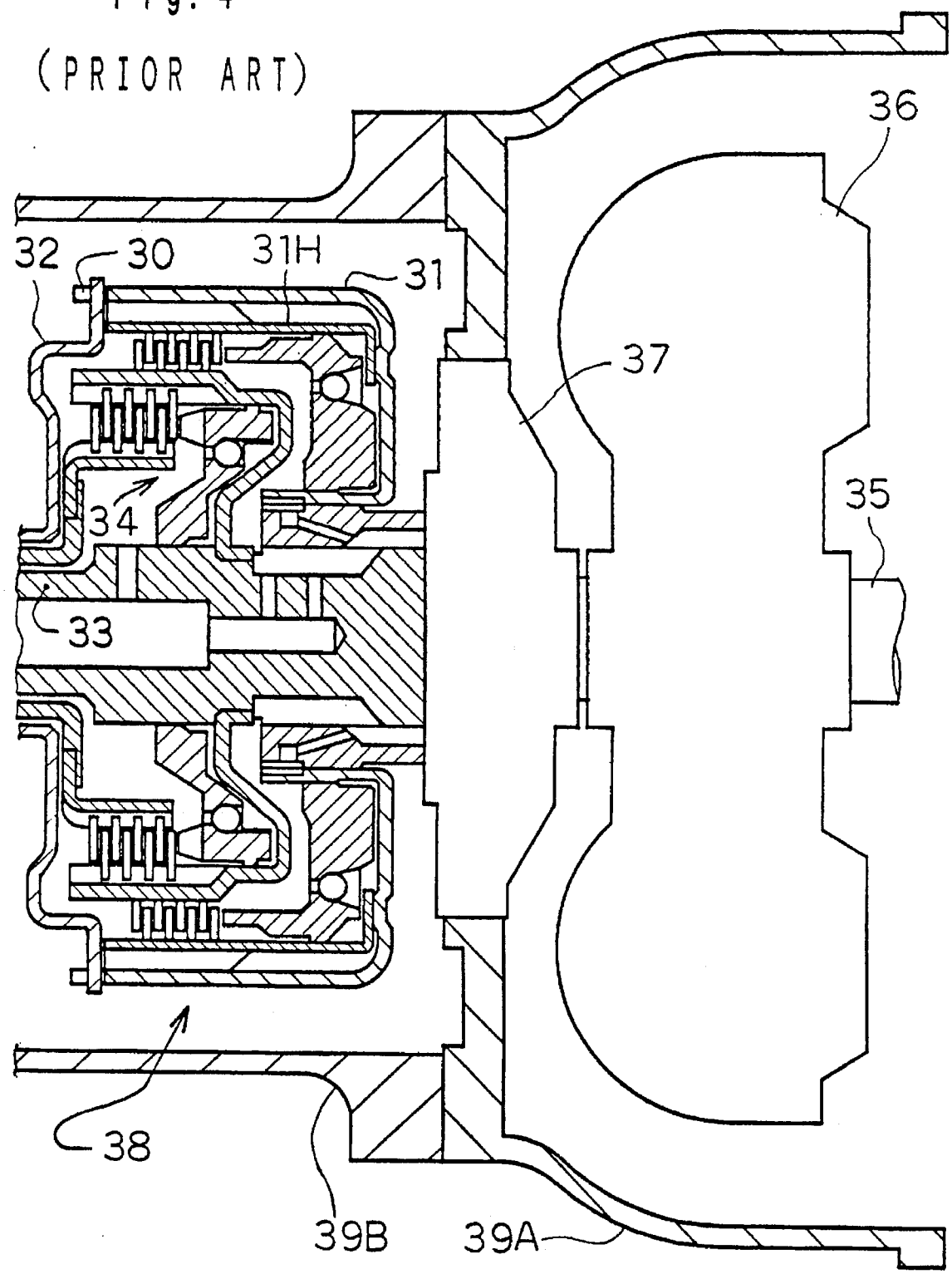
FIG. 4 is a partial sectional view illustrating an automatic transmission.

FIG. 1A is a partial enlarged sectional view illustrating a part corresponding to the engagement structure 30 illustrated in FIG. 4. FIG. 1B is a partial enlarged side view of a reverse clutch drum. Herein, there is locally increased the thickness of an abutment part between the reverse clutch drum 31 and the connecting shell 32 illustrated in FIGS. 4 and 5.

Figure 5:
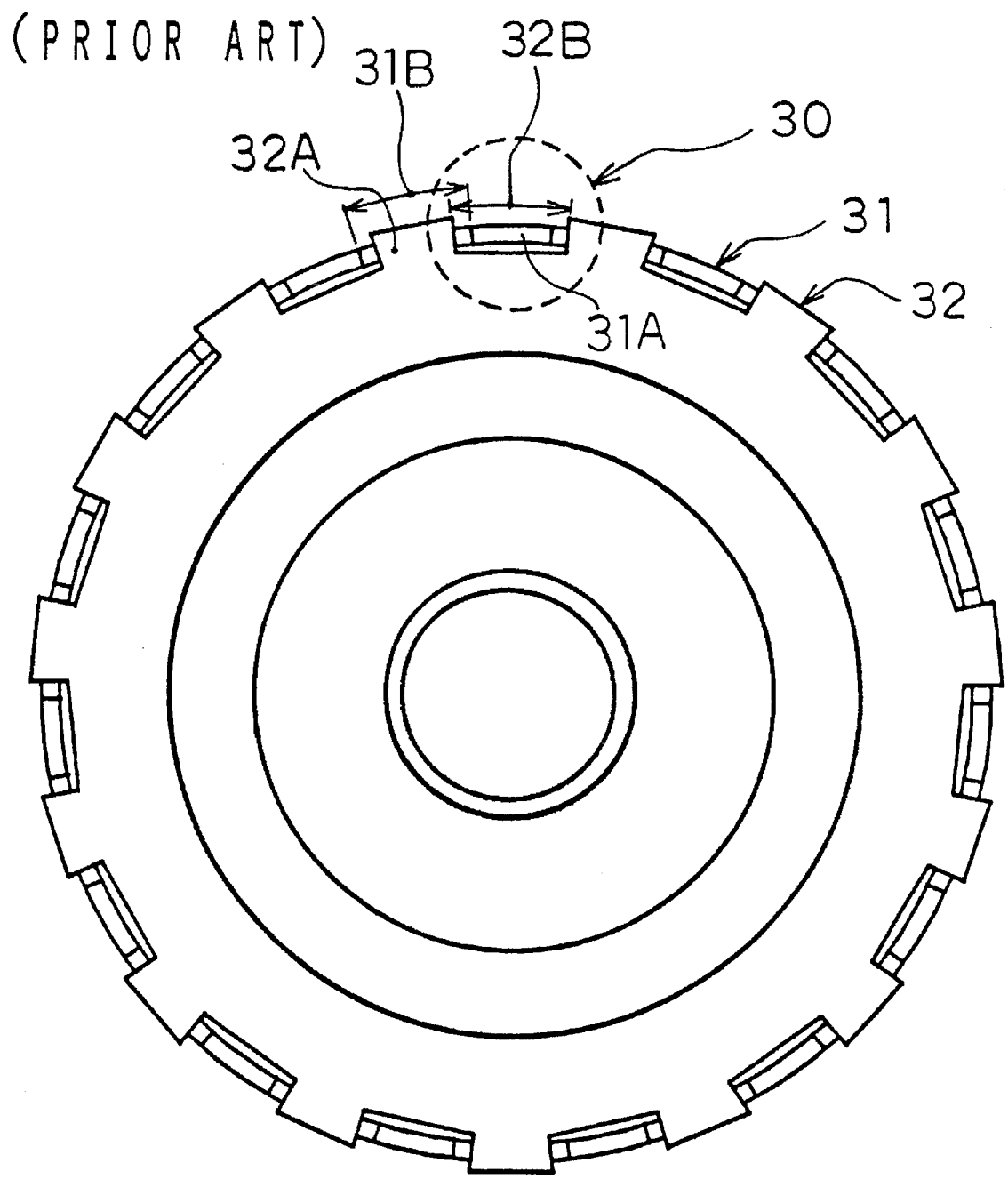
FIG. 5 is a view illustrating the engagement structure viewed from a leftside of FIG. 4.

A reverse clutch drum 11 and a connecting shell 12 illustrated in FIG. 1A are designed as in the reverse clutch drum 31 and the connecting shell 32 illustrated in FIGS. 4 and 5 excepting the configurations of edges of protrusions 11A, 12A and of edges of grooves 11B, 12B that are different from those of the protrusions 31A, 32A illustrated in FIGS. 4 and 5.

The entire structure of the present embodiment can further be understood also with reference to FIGS. 4 and 5.

An engagement structure 10 is illustrated in a broken line FIG. 1A correspondingly to the egagement strucutre 30 illustrated in FIG. 4. In the engagement structure 10, a protrusion 12A of a connecting shell 12 is engaged with a groove 11B of a reverse clutch drum 11. The groove 11B is formed by cutting out a cylinder end of an cylindrical outer peripery of the reverse clutch drum 11 axially (left and right) at an equal interval as illustrated in FIG. 1B. Edges 11C of a protrusion 11A held between the adjacent grooves 11B abut the edges 12C of the protrusion 12A of the connecting shell 12 for transmittal of torque. The protrusion 12A is formed by cutting out an outer periphery of the connecting shell 12 radially at an equal interval. The protrusion 11A of the reverse clutch drum 11 is engaged with the groove 12B held between the adjacent two protrusions 12A. When replacing a clutch plate, etc., kept in an inside space of the reverse clutch drum 11 is needed the engagement is rapidly removed by sliding the connecting shell 12 in the upper direction on the paper in FIG. 1A.

The connecting shell 12 is locally more increased in its thickness over the entire length of the edge 12C along the protrusion 12A and the groove 12B. The thick part of the edge 12C is formed by rendering, upon pressing a material steel plate of the connecting shell 12 to form the groove 12B, the edge 12C to plastic deformation simultaneously.

Figure 1B:
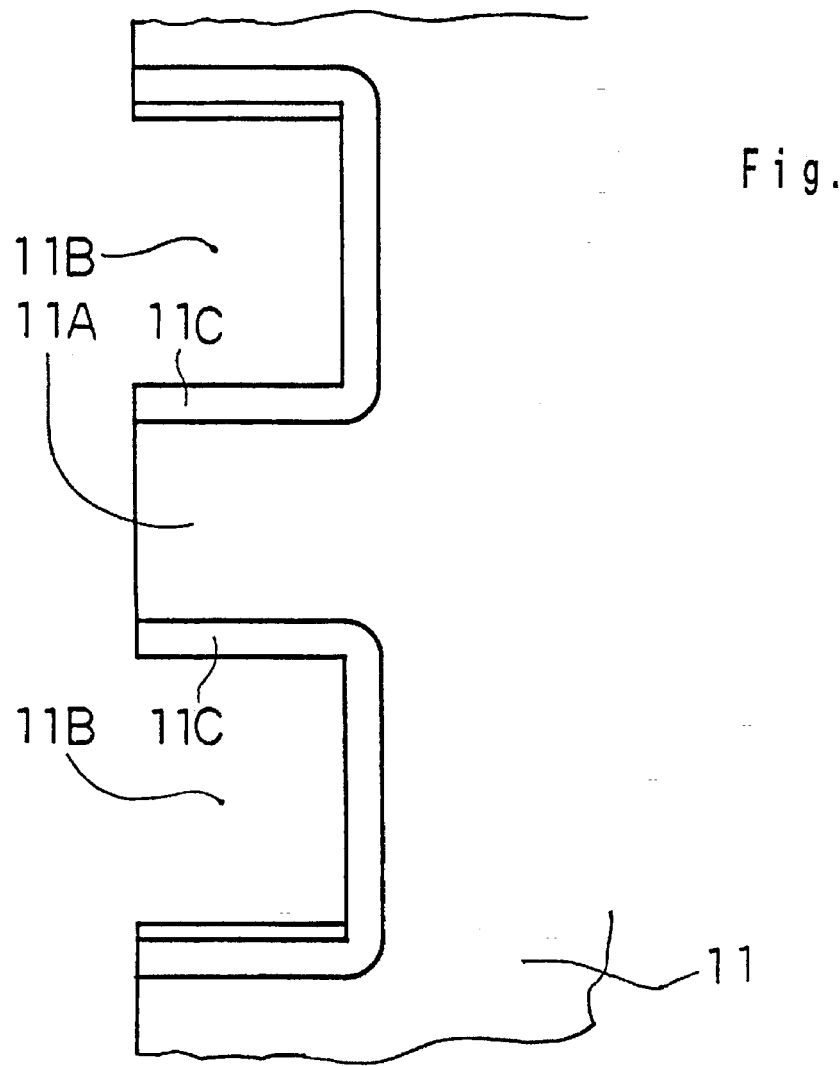
FIG. 1B is a partial enlarged side view of a reverse clutch drum of the first embodiment of the present invention.

The reverse clutch drum 11 is locally more increased in its thickness than other portions with respect to the edge 11C surrounding the groove 11B, as ilustrated in FIG. 1B. The thick part of the edge 11C is formed by rendering, upon pressing a material steel plate of the reverse clutch drum 11 to form the groove 11B, the edge 11C to plastic deformation simultaneously.

According to the first embodiment of the engagement structure as described above, torque is transmitted by allowing the edge 12C of the protrusion 12A that is formed to be locally thick to abut the edge 11C of the protrusion 11A that is formed to be locally thick, so that a force reception area (a) of the abutment part is increased compared with the prior art example where the thickness is not increased locally and hence pressure p (surface pressure) is lowered provided the same torque is transmitted. In contrast, provided the same pressure p is allowed, larger torque may be transmitted.

Most parts of the reverse clutch drum 11 and the connecting shell 12 excepting the engagement structure 10 are kept to be the same thickness as in the prior art, so that there is no possibility of any interference with the other members being caused radially and diametrically, and all other parts are usable commonly with conventional members. Since a weight increase caused by the local thickness increase is substantially ignorable, the total weight of the gear change mechanism is not increased.

Since there is no member whose thickness is increased in an area close to a main shaft, the axial size of the gear change mechanism is also not altered.

Further, the local thickness increase processing is executed simultaneously with the pressing required for an original processing, so that there are substantially not increased the costs of materials and processings of the reverse clutch drum 11 and the connecting shell 12. Since the masses of the reverse clutch drum 11 and the connecting shell 12 are only slightly increased, there is no possibility of the engagement structure being destroyed owing to centrifugal force upon high speed rotation of the engagement structure.

Since the thickness is continuously increased not only for the part where the reverse clutch drum 11 and the connecting shell 12 actually abut for transmittal of torque but also for the entire of the edge 11C surrounding the groove 11B concerning the reverse clutch drum 11 and also for the outer peripheral edge of the protrusion 12A and the entire of the edge 12C of the groove 12B concerning the connecting shell 12, buckling of the protrusions 11A, 12A is unlikely to be caused, and hence the entire strength of the reverse clutch drum 11 and the connecting shell 12 is also increased. There is therefore reduced any noise and vibration which might be produced with high load and upon high speed rotation. Thus, a miniature light weight high output automatic transmission is provided inexpensively with high reliability together with an advantage of its common use with parts of conventional structures.

Although in the first embodiment there was described only the engagement structure between the reverse clutch drum 11 and the connecting shell 12, the present invention is widely applicable to an engagement structure where a drum type component and a radiation type component intersecting the drum type component are arranged to be separable axially by engaging a protrusion in a groove. The present invention is further applicable to engagement structures between coupling elements other than the connecting shell and rotary components, and engagement structures between rotary components.

Figure 2A:
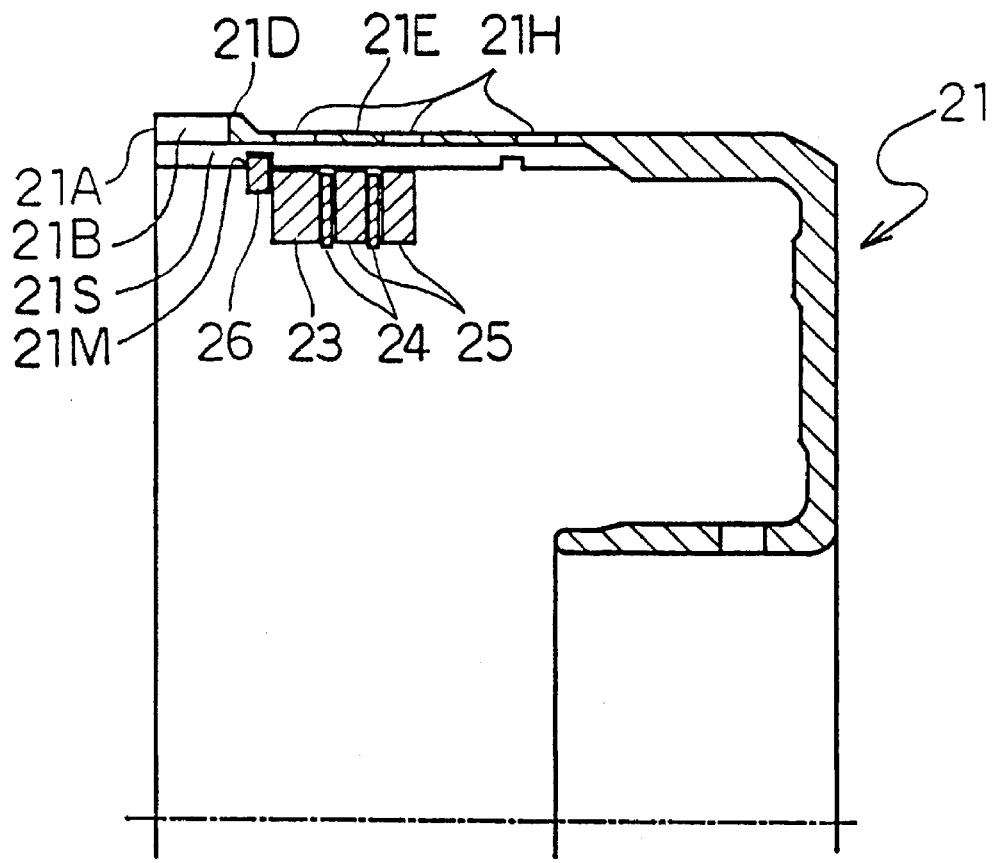
FIG. 2A is a longitudinal sectional view illustrating a clutch drum of a second embodiment of the engagement structure of the present invention.
Figure 2B:
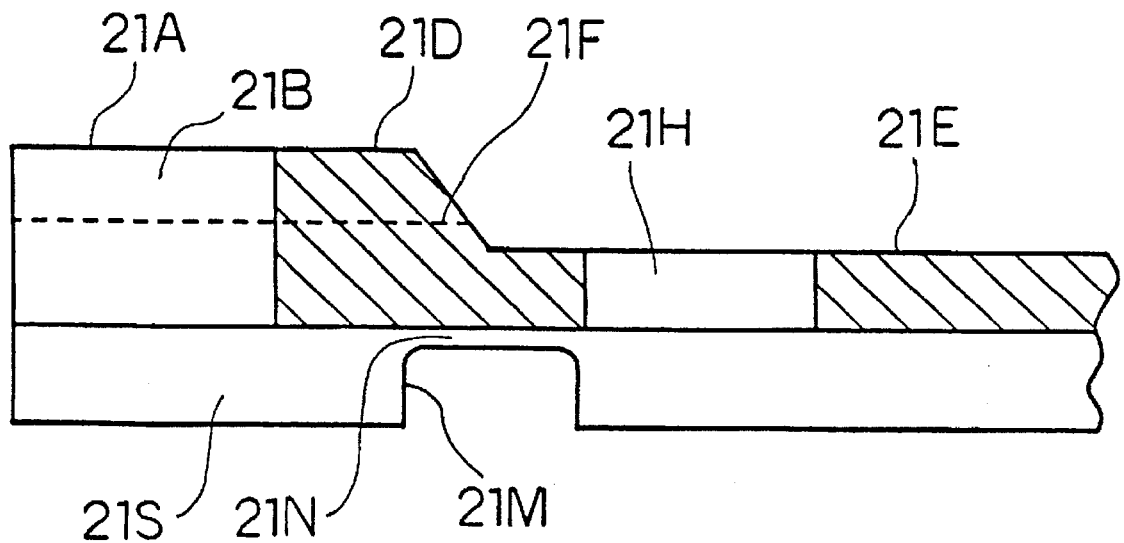
FIG. 2B is a partially enlarged view of an entrance part of the clutch drum in FIG. 2A.
Figure 3A:
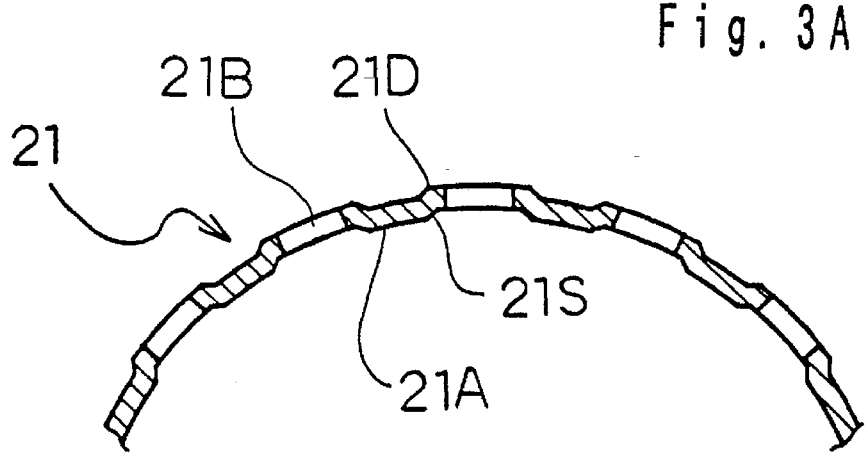
FIG. 3A is a sectional view of the entrance part of the clutch drum of FIG. 2B viewed axially thereof.
Figure 3B:
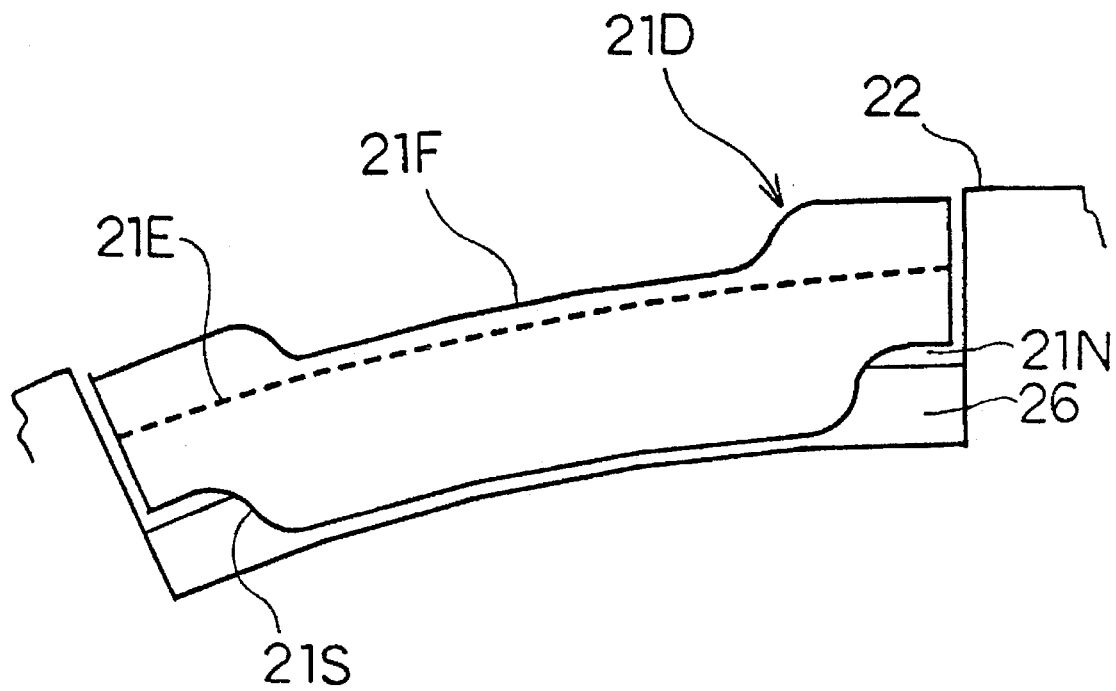
FIG. 3B is an enlarged view of the entrance part of FIG. 3A when combined with other parts.

In the following, a second embodiment of the engagement structure of the present invention will be described with reference to FIGS. 2A–3B. FIG. 2A is a longitudinal sectional view of the upper half of a clutch drum, and FIG. 2B is a partial enlarged view of the entrance part of a clutch drum. FIG. 3A is an axially perpendicular sectional view of the entrance part, and FIG. 3B is an enlarged view of the entrance part combined with a retaining plate.

An oil discharge space 21N is secured axially at a bottom of the spline 21S of the clutch drum 21. The clutch drum 21 is made light weight by shaving the outer periphery of the clutch drum 21 leaving behind an abutment part 21D of the clutch drum 21 with respect to the connecting shell 22.

In FIG. 2A, the spline 21S formed on the inner periphery side of the clutch drum 21 directly restricts rotations of a drive plate 25 and a retaining plate 23. In contrast, a driven plate 24 rotatable with repect to the clutch drum 21 is held between the drive plate 25 and the retaining plate 23 and is restricted in its rotation by a spline of an inside rotary member not illustrated.

A hydraulic piston not illustrated is disposed interiorly of the clutch drum 21. The hydraulic piston energizes the drive plate 25 to the entrance side, and compresses the drive plate 25 and the driven plate 24 jointly with the retaining plate 23 restricted in its axial movement by the snap ring 26.

Hereby, frictional force is produced between the drive plate 25 and the driven plate 24 to achieve power transmittal from the clutch drum 21 to the inside rotary members.

The snap ring 26 is fitted to a ring groove 21M with the depth not reaching the bottom of the spline 21S.

As illustrated in FIG. 2B, many oil discharge holes 21H are formed in the bottom of the spline 21S like a dryer basket of a washer. Lubricating oil supplied from the side of a main shaft during operation is urged by the centrifugal force to pass through an interstice between the drive plate 25 and the driven plate 24, and is collected on the bottom of the spline 21S of the clutch drum 21, and is thereafter driven to flow axially and discharged from the oil discharge holes 21H to the side of the outer periphery.

As illustrated in FIG. 3A, the protrusion 21A of the clutch drum 21 occupies the entire of a top part (a part protruded toward the center) of the spline 21S and parts of the bottoms located at both sides of the top part. Accordingly, the groove 21B of the clutch drum 21 occupies a central part of one bottom of the spline 21S.

In FIG. 3B, there is secured an axially extending oil discharge space 21N in an interstice between the bottom of the spline 21S and the outer periphery of the snap ring 26. An interstice between an abutment part 21D of the clutch drum 21 and the connecting shell 22 is lubricated with the oil flowing out from the oil discharge space 21N.

As illustrated in FIGS. 2A, 2B and 3B, a surrounding part of the protrusion 21A of the clutch drum 21 forms a thick abutment part 21D. In a cylindrical part 21E located therebehind, a contact surface with a band brake not illustrated is constructed by shaving the outer periphery of the cylindrical part after formation of the spline 21S into a thin shape, and the moment of inertia of the clutch drum 21 and the weight of the same are reduced.

Further, an axial shallow groove is formed also in "an intermediate part 21F between the opposite abutment parts 21D" in the protrusion 21A to make the clutch drum thinner.

The clutch drum 21 is made thinner at parts thereof other than the abutment part 21D in such a manner whereby the abutment part 21D is relatively thick walled as in the embodiment of FIG. 1.

According to the second embodiment of the engagement structure constructed as described above, the clutch drum 21 is made thinner leaving behind the abutment part 21D. Accordingly, a greater abutment area between the clutch drum 21 and the connecting shell 22 is secured to restrict surface pressure, and hence there are ensured high torque transmittal, miniaturization and light weight due to the reduction of the diameter of the clutch drum, a long life, and high reliability as in the first embodiment.

Further, there is reduced any damage (drum burst) due to centrifugal force by the reduction of the moment of inertia and the weight owing to the thin wall to ensure high speed rotation.

Further, since the oil discharge space 21N is secured, an oil discharge speed in the clutch drum 21 is increased and hence drag torque caused by residence and viscocity of oil (torque for the drive plate to drag the driven plate) is reduced to improve torque transmittal efficiency and hence improve the fuel cost. Since there are reduced vibration of the driven plate and a striking phenomenon of the clutch drum coupling part owing to the reduction of the dragging, a noise level of the automatic transmission in a neutral range and a reverse range is reduced.

Although in the second embodiment, the clutch drum is made thinner by shaving after the formation of the spline, the clutch drum may be made thinner by pressing.

According to the engagement structure of the connecting shell of the present invention, surface pressure of the abutment part is reduced by the local thickness increase, so that higher torque is transmitted compared with the case where no local thickness increase is existent provided the same pressure is applied. Further, with the same torque transmittal, there is reduced the weight of the member by reducing the thickness of the entire member, and there is achieved a long life by dropping a wear speed of the member, and there is reduced the diameter of the clutch drum.

Since the thickness of the entire member is not increased, the weight of the member and the rotational mass of the same are not increased and hence the automatic transmission is not prevented from being miniaturized and made light weight. Further, since there is no need of changing the diametrical and axial sizes of the entire drum type component and radiation type component, the present invention is applicable to conventional automatic transmissions in themselves with the minimum parts replacement. In the case where the local thickness increase is realized by rendering the edge to plastic deformation upon pressing, an increase of the processing cost is very slight.

When the entire of the edge of the groove of the clutch drum is made continuously thicker, surface pressure of the abutment part during torque transmittal is effectually reduced while utilizing a conventional design and a conventional fabrication process of the clutch drum to the utmost and while securing compatibility with other parts to be assembled to the utmost, whereby the foregoing effect is ensured. Further, owing to the reinforcement by the thicker part continuously formed from the abutment part of the clutch drum, greater torque can be correspondingly transmitted, and also reduction of any vibration and noise and miniaturization and reduction of weight of the whole automatic transmission is easily achieved.

When the entire of the edge of the protrusion of the connecting shell is made continuously thicker, surface pressure of the abutment part is effectually reduced while utilizing a conventional design and a conventional fabrication process of the connecting shell to the utmost and while securing compatibility with other parts to be assembled to the utmost, whereby the foregoing effect is ensured. Further, owing to the reinforcement by the thicker part continuously formed from the abutment part of the connecting shell, greater torque can be correspondingly transmitted for reduction of any vibration and noise and for ease of miniaturization of the automatic transmission is easily achieved.

What is claimed is:

1. An engagement structure between a clutch drum having a plurality of grooves formed by cutting out an end of a cylindrical outer periphery of the clutch drum at an equal interval and a connecting shell disposed intersecting said clutch drum and having a plurality of protrusions formed by cutting out a circumferential part of the connecting shell at an equal interval, said protrusions being engaged with said grooves, the improvement comprising the thickness of three successive edges of said grooves of said clutch drum are continuously formed to be thicker than the clyindrical outer periphery thereof.

2. An engagement structure according to claim 1 wherein the thickness of three successive edges of the protrusions of said connecting shell are continously formed to be thicker than the radial part located thereinside.

3. An engagement structure according to claim 1, wherein each of said grooves of the clutch drum is aligned with a valley expanding to the outside of a spline formed on the inner surface of said clutch drum, and wherein an axially extending interstice is formed between an outer periphery of a snap ring fitted to said spline and the bottom of said valley.

4. An engagement structure between a clutch drum having a plurality of grooves formed by cutting out an end of a cylindrical outer periphery of the clutch drum at an equal interval and a connecting shell disposed intersecting said clutch drum and having a plurality of protrusions formed by cutting out a circumferential part of the connecting shell at an equal interval, said protrusions being engaged with said grooves, the improvement comprising the thickness of three successive edges of said protrusions of said connecting shell are continously formed to be thicker than the radial part located thereinside.

5. An engagement structure according to claim 4, wherein each of said grooves of the clutch drum is aligned with a valley expanding to the outside of a spline formed on the inner surface of said clutch drum, and wherein an axially extending interstice is formed between an outer periphery of a snap ring fitted to said spline and the bottom of said valley.

6. An engagment structure between a clutch drum having a plurality of grooves formed by cutting out an end of a cylindrical outer periphery of the clutch drum at an equal interval and a connecting shell disposed intersecting said clutch drum and having a plurality of protrusions formed by cutting out a circumferential part of the connecting shell at an equal interval, said protrusions being engaged with said grooves, the improvement comprising at least one edge of said grooves and at least one edge of said protrusions along which said grooves and said protrusions abut circumferentially for transmittal of torque are formed to be thicker than other parts of the same member.

* * * * *